W. EHRHART.
FEEDING DEVICE FOR DOUGH ROLLING MACHINES.
APPLICATION FILED OCT. 12, 1914.
1,158,908.
Patented Nov. 2, 1915.
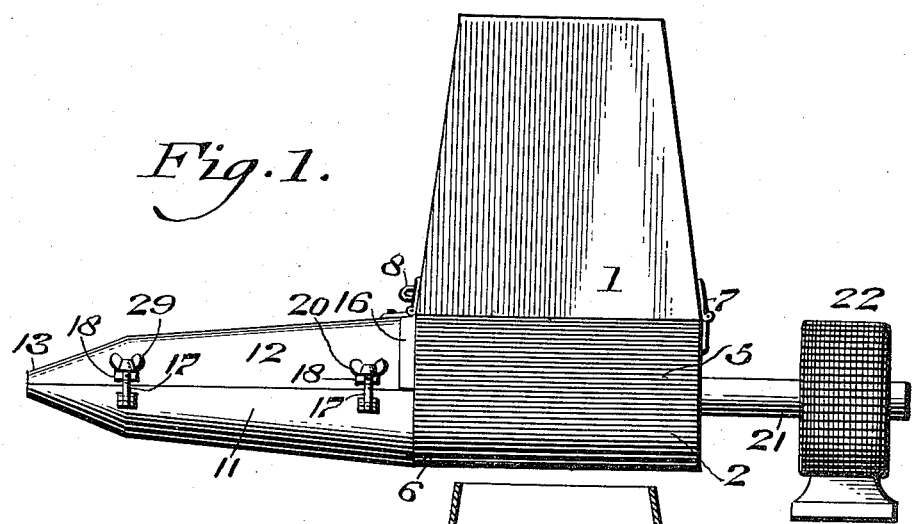
Fig. 1.
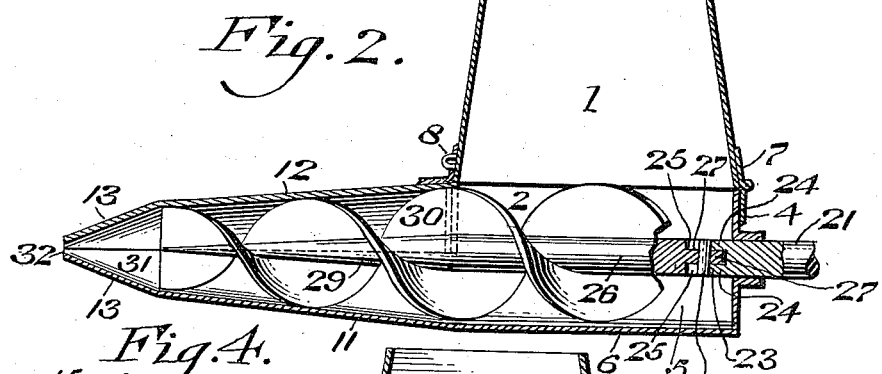
Fig. 2.
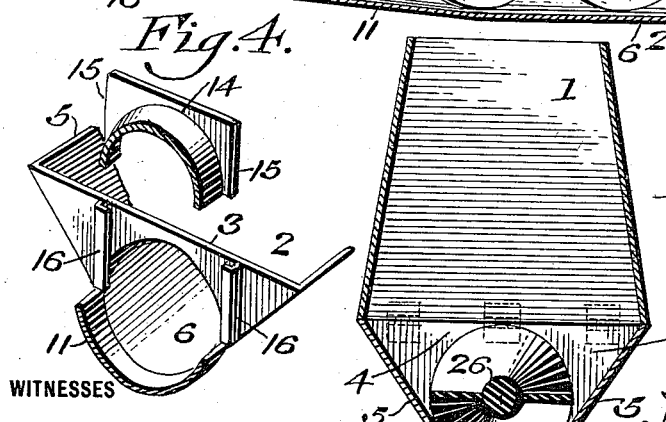
Fig. 4.
Fig. 3.
WITNESSES
INVENTOR
William Ehrhart
ATTORNEYS

UNITED STATES PATENT OFFICE.

WILLIAM EHRHART, OF LANCASTER, PENNSYLVANIA.

FEEDING DEVICE FOR DOUGH-ROLLING MACHINES.

1,158,908. Specification of Letters Patent. Patented Nov. 2, 1915.

Application filed October 12, 1914. Serial No. 866,245.

*To all whom it may concern:*

Be it known that I, WILLIAM EHRHART, a citizen of the United States, residing in the city and county of Lancaster, State of Pennsylvania, have invented a new and useful Feeding Device for Dough-Rolling Machines, of which the following is a specification.

My invention consists of an improved machine for feeding dough in strips, such as for instance in pretzel-machines, in which the stiff dough will freely pass from the hopper to the feed-helix.

It further consists of such a feeder in which the feed-helix will carry all the dough with it and not leave portions in the machine to become sour.

It further consists of such a feeder which may be easily dismantled for cleaning it and be easily assembled.

It further consists of other novel features of construction, all as will be hereinafter fully set forth.

The annexed drawing and the following description set forth in detail one mechanical form embodying the invention, such detail construction being but one of various mechanical forms in which the principle of the invention may be used.

In said annexed drawings—Figure 1 represents a side view of my improved feeder. Fig. 2 represents a longitudinal section of the same. Fig. 3 represents a transverse section of the hopper and feed-helix. Fig. 4 represents a perspective view of the end of the bottom of the hopper with the lower half of the tapering nozzle broken away and removed, and the upper half of the tapering nozzle broken away and removed, and its base lifted out of the seat upon the front of the bottom of the hopper.

Similar numerals of reference indicate corresponding parts in the figures.

Referring to the drawing, the reference numeral 1 indicates a hopper having its sides downwardly flaring and bearing with the edges of such sides against the edges of a bottom-portion, 2, having vertical ends, 3 and 4, and inwardly slanting sides, 5, which merge into a bottom, 6, of segmental cross-section. The hopper is preferably secured to the bottom-portion by means of hinges, 7, at one end, and by a hasp and staple, 8, at the other end. An outwardly tapering lower portion, 11, of a tapering nozzle extends from a circular opening in one end of the bottom portion and is concentrically rounded with the rounded bottom of said portion, to form the lower portion of a tapering nozzle, and a similarly shaped upper nozzle-portion, 12, fits with its straight lower edges upon the straight upper edge of the lower nozzle-portion to form a complete tapering nozzle. The outer ends, 13, of said nozzle-portions are formed with a steeper taper to contract the outer end of the nozzle. The inner end of the upper nozzle portion has an upwardly and laterally projecting plate, 14, the lateral flanges, 15, of which are slidable in flanged ways, 16, upon the end of the bottom-portion. Screw-bolts, 17, are pivoted upon the sides of the lower nozzle-portion and can swing up between slotted ears, 18, upon the sides of the removable upper nozzle-portion when the latter is in place with its flanges in the flanged ways, and the two portions can be drawn firmly together by the thumb-nuts 20, upon the hinged screw-bolts. A drive-shaft, 21, has a motor, 22, or whatever other rotary driving means may be convenient to rotate it, and the end of said shaft has a forked end, 23, the sides, 24, of which have longitudinal open-ended slots, 25. A spindle or hub, 26, is revoluble in the tapering nozzle and has a tenon or shouldered tongue, 27, at its inner end, through which is secured a transverse bolt, 28, and the tongue can enter the forked end of the drive-shaft and have the ends of its bolt enter the open-ended slots in the sides of the fork, so that rotary motion can be communicated to the spindle. The spindle has a taper to the portion 29, within the tapered nozzle which taper is at the same angle to the axis of the nozzle as that of the nozzle, and spiral flanges, 30, are secured upon the spindle at equal distances from each other and of a height to just clear the sides of the nozzle, so that the spaces between the flanges will be equal at all points and an equal amount of dough is fed outward by the helical feeder to the end of the nozzle at all points of the same until it reaches the space, 31, within the restricted taper where it will be squeezed out through a discharge opening, 32, for further treatment.

In practice, the dough, which is usually pretzel dough, for which my feeder is especially designed, and which is of a rather stiff consistency, can spread out in the lower flaring portion of the hopper and will not pack or bridge, as is liable to happen in a downwardly tapering hopper. Such hoppers have been the cause of serious accidents, as the attendant would reach into the hopper with his hand to force the dough to the feeder screw and would get caught and either have his hand crushed or fingers broken or cut off. In the present hopper the dough falls freely in the larger space, and will be carried forward by the helical feeder without any choking, packing or bridging. The inclined sides of the bottom portion will admit of the dough rolling by gravity toward the helical feeder, and the circular outlines of the helical feeder, working opposite the concavo-cylindrical bottom, substantially scraping the latter clean, so that there will be no opportunity for dough to collect in corners and turn sour, nor will there be a great deal of cleaning necessary when the machine is stopped for cleaning.

By tilting the hopper back and removing the upper portion of the nozzle, the helical feeder can be removed, and the entire apparatus is conveniently accessible for complete cleaning.

While the feeding device is particularly designed for pretzel machines, it is evident that it may be used for feeding other dough or for feeding other plastic material.

Other modes of applying the principle of my invention may be employed for the mode herein explained. Change may therefore be made as regards the mechanism thus disclosed provided the principles of construction set forth respectively in the following claims are employed.

Having thus described my invention what I claim as new and desire to secure by Letters Patent, is:—

1. In an apparatus of the character stated, a bottom-portion having a bottom segmental in cross-section and upwardly and laterally diverging sides, a hopper having downwardly diverging sides secured with their lower edges to the upper edges of said diverging sides, a tapering nozzle and extending from one end of the bottom-portion and axially projecting from the same, and a helical feeder having its flange in close proximity to the inner surface of the segmental bottom-portion and of the nozzle and axially rotatable in the bottom-portion and nozzle.

2. In an apparatus of the character stated, a bottom-section having a bottom segmental in cross-section and a circular opening in one end, a hopper closing said section, a nozzle-section tapering outward from the lower half of said opening, an upper tapering nozzle-section having its edges fitting upon the edges of the lower section and lateral guide-flanges at its inner end, overlapping guide flanges at the sides of the opening in the end of the bottom section to receive the flanges of the upper nozzle-section, and a helix axially rotatable in the bottom section and nozzle.

3. In apparatus of the character stated, a bottom-portion formed with inwardly-slanting sides and with a bottom segmental in cross-section and with a nozzle-section extending from the lower part of a circular opening in one end and semi-circular in cross section and outwardly tapering and also formed with flanged guide-ways upon its end registering with the upper edges of the lower nozzle-section, an upper nozzle section likewise tapered and semicircular in cross section having lateral flanges engaging the guide-ways and having its edges fitting against the edges of the lower nozzle-section, means at the sides of said nozzle-sections to detachably secure the same together, a hopper having downwardly flaring sides fitting upon the upper edges of the bottom-portions and hinged at one edge to the same and locked at the opposite edge thereto, a rotatable hub in the bottom-section and in the nozzle and having a taper parallel to that of the nozzle, a helical flange upon said hub and having its outer edges closely fitting toward the interior of the nozzle, and a drive-shaft in one end of the bottom-portion and detachably engaging the end of the hub.

WILLIAM EHRHART.

Witnesses:
JOHANN J. WASHEIM,
THOS. LECLEUR.

Copies of this patent may be obtained for five cents each, by addressing the "Commissioner of Patents, Washington, D. C."